United States Patent
Belghoul et al.

(10) Patent No.: US 11,071,007 B2
(45) Date of Patent: Jul. 20, 2021

(54) CROSS FUNCTIONAL SIGNALING IN OFF GRID RADIO SERVICE DEVICES FOR REDUCED OVER-THE-AIR OVERHEAD

(71) Applicant: Apple Inc., Cupertino, CA (US)

(72) Inventors: Farouk Belghoul, Campbell, CA (US); Christian W. Mucke, Cupertino, CA (US); Ehsan E. Haghani, Redwood City, CA (US)

(73) Assignee: Apple Inc., Cupertino, CA (US)

(*) Notice: Subject to any disclaimer, the term of this patent is extended or adjusted under 35 U.S.C. 154(b) by 151 days.

(21) Appl. No.: 16/043,192

(22) Filed: Jul. 24, 2018

(65) Prior Publication Data

US 2019/0045389 A1 Feb. 7, 2019

Related U.S. Application Data

(60) Provisional application No. 62/541,137, filed on Aug. 4, 2017.

(51) Int. Cl.
*H04W 76/28* (2018.01)
*H04W 28/02* (2009.01)
(Continued)

(52) U.S. Cl.
CPC ......... *H04W 28/0273* (2013.01); *H04W 4/20* (2013.01); *H04W 4/70* (2018.02); *H04W 8/005* (2013.01); *H04W 16/14* (2013.01); *H04W 76/14* (2018.02); *H04L 69/321* (2013.01); *H04W 48/10* (2013.01); *H04W 76/20* (2018.02); *H04W 80/00* (2013.01); *H04W 92/18* (2013.01)

(58) Field of Classification Search
CPC ................ H04L 69/321; H04W 16/14; H04W 28/0273; H04W 48/10; H04W 4/20; H04W 4/70; H04W 76/10; H04W 80/00; H04W 8/005; H04W 92/18
See application file for complete search history.

(56) References Cited

U.S. PATENT DOCUMENTS

2009/0049159 A1* 2/2009 Boscovic .............. H04W 88/06
709/221
2011/0069636 A1* 3/2011 Shao ...................... H04W 72/02
370/254
(Continued)

FOREIGN PATENT DOCUMENTS

WO WO2018062940 A1 4/2018

*Primary Examiner* — Phuc H Tran
(74) *Attorney, Agent, or Firm* — Kowert, Hood, Munyon, Rankin & Goetzel, P.C.

(57) ABSTRACT

This disclosure relates to techniques for supporting cross functional signaling for device-to-device wireless communication, such as an off grid radio system. According to some embodiments, a first wireless device may initiate, modify, and/or close a device-to-device wireless communication session with a second wireless device using session management signaling associated with a protocol layer (possibly a higher layer, such as a layer supported by an application processor) of the first wireless device. The wireless device may provide indications of session initiation, modification, and/or closing from the protocol layer used to exchange the session management signaling to another protocol layer (possibly a lower layer, such as a layer supported by a baseband processor) of the first wireless device.

17 Claims, 8 Drawing Sheets

(51) Int. Cl.
*H04W 8/00* (2009.01)
*H04W 16/14* (2009.01)
*H04W 4/70* (2018.01)
*H04W 76/14* (2018.01)
*H04W 4/20* (2018.01)
H04W 92/18 (2009.01)
H04W 76/20 (2018.01)
H04W 48/10 (2009.01)
H04W 80/00 (2009.01)
H04L 29/08 (2006.01)

(56) References Cited

U.S. PATENT DOCUMENTS

| | | |
|---|---|---|
| 2017/0048894 A1 | 2/2017 | Choi |
| 2018/0097850 A1* | 4/2018 | Baek .................. H04L 65/1059 |
| 2018/0124848 A1* | 5/2018 | Fukuta .................. H04L 29/06 |
| 2019/0037532 A1* | 1/2019 | Baghel ................. H04W 76/14 |
| 2020/0120745 A1* | 4/2020 | Yang ..................... H04W 8/005 |

* cited by examiner

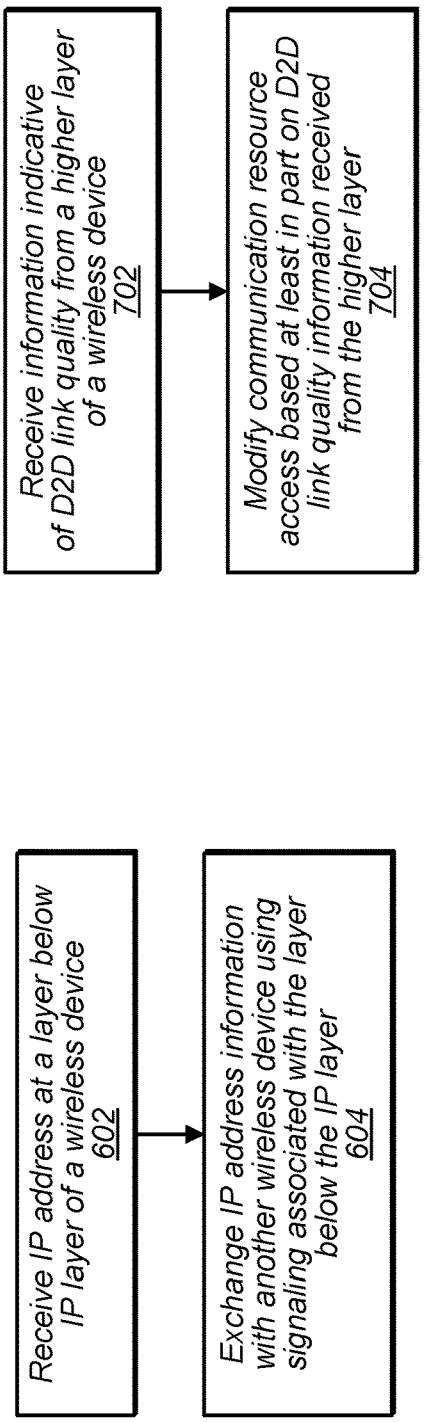
FIG. 7
FIG. 6
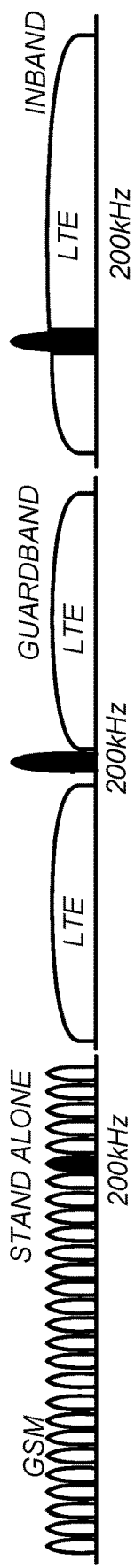
FIG. 8

US 11,071,007 B2

CROSS FUNCTIONAL SIGNALING IN OFF GRID RADIO SERVICE DEVICES FOR REDUCED OVER-THE-AIR OVERHEAD

PRIORITY INFORMATION

This application claims priority to U.S. provisional patent application Ser. No. 62/541,137, entitled "Cross Functional Signaling in Off Grid Radio Service Devices for Reduced Over-the-Air Overhead," filed Aug. 4, 2017, which is hereby incorporated by reference in its entirety as though fully and completely set forth herein.

TECHNICAL FIELD

The present application relates to wireless communication, including to techniques for using cross functional signaling when performing device-to-device wireless communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. Therefore, improvements in the field are desired.

SUMMARY

Embodiments are presented herein of, inter alia, systems, apparatuses, and methods for using cross functional signaling when performing device-to-device wireless communication.

As noted above, the number of use cases for different classes of wireless devices with widely variable capabilities and usage expectations are growing. While many wireless communication systems primarily utilize infrastructure mode type communications, e.g., in which one or more base stations and potentially a supporting network are used as intermediaries between endpoint devices, one possible use case for wireless communication includes direct device-to-device communications. This disclosure presents various techniques for supporting such communications.

Among the features and techniques described herein are techniques for reducing the redundancy of over-the-air communications, such as by providing cross-layer communication mechanisms for multiple layers within a wireless device to share at least some of their functionality. For example, cross-functional signaling for session initiation, modification, and closing may be used, such that over-the-air signaling supporting such functions may be performed by one protocol layer within a device, which may then indicate any session changes to other interested protocol layers within the device. Similarly, security/authentication functions may be performed at one layer within a device, rather than performed redundantly by multiple layers within the device, which may also/alternatively reduce the amount of communication that needs to occur over-the-air. Such techniques may be useful for low-throughput communication technologies/scenarios, among other possible scenarios, since in such scenarios increases in overhead communications may have an outsized impact on the amount of data that can be communicated.

Cross-layer information sharing may further be used for other purposes, at least according to some embodiments of this disclosure. For example, at least in some instances, it may be useful to provide information indicative of transmission/reception success/failure rates, end-to-end delays, and/or other metrics related to link/channel quality, from higher layers to lower layers. Such information may help support link adaptation features at the lower layers, for example in scenarios in which such information is not natively available at the lower layers, at least according to some embodiments.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 5-7 are flowchart diagrams illustrating exemplary methods for using cross functional signaling when performing device-to-device wireless communications, according to some embodiments;

FIG. 8 illustrates various exemplary possible NB-IoT carrier deployment scenarios, according to some embodiments;

Figure 1:
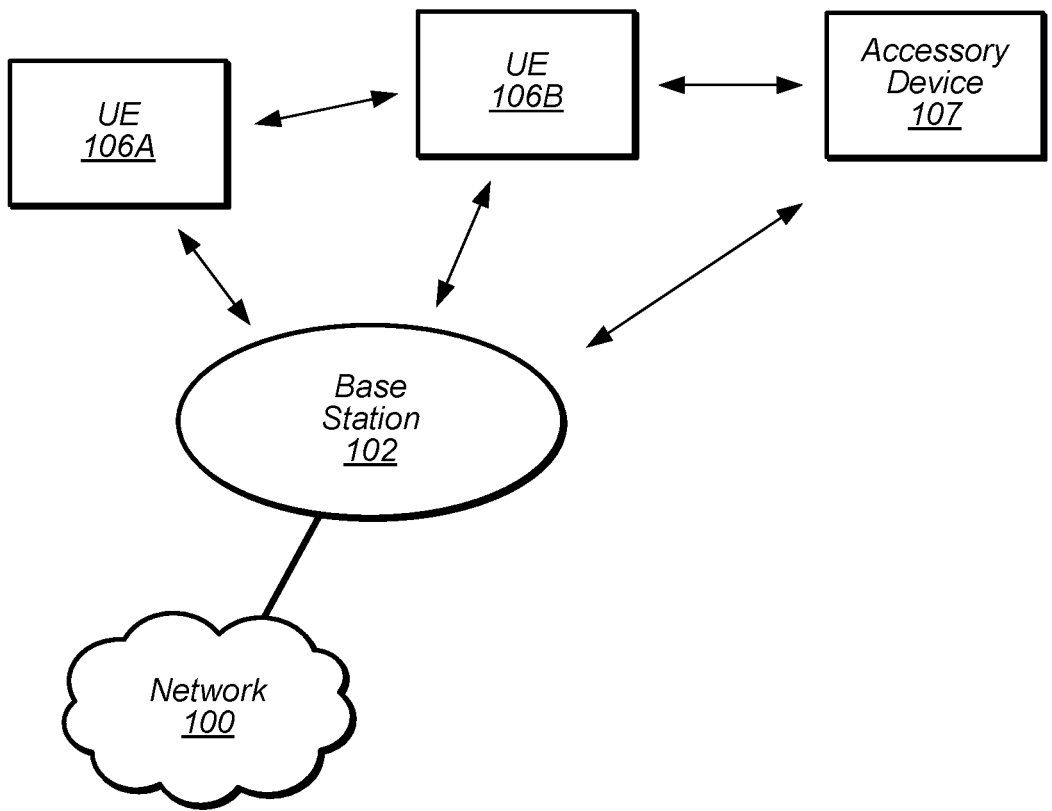
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution
OGRS: Off Grid Radio Service
IoT: Internet of Things
NB: Narrowband
D2D: device-to-device
OOC: out-of-coverage Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
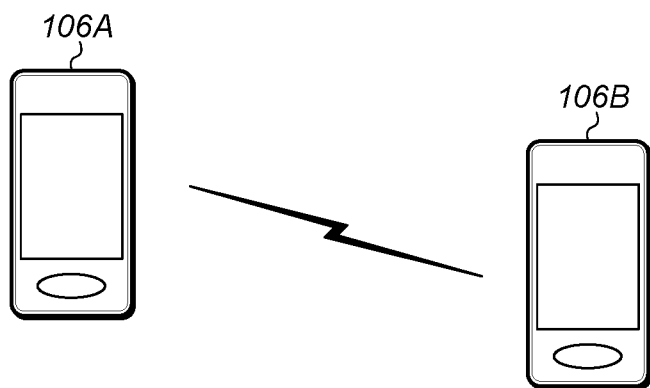
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), 5G NR, OGRS, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, OGRS, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, according to at least some aspects of this disclosure, the UE 106A and UE 106B may be capable of arranging and performing D2D communication (e.g., including D2D discovery communications) with each other even when out-of-coverage of the BS 102 and other cellular base stations.

FIG. 2 illustrates example UE devices 106A, 106B in D2D communication with each other. The UE devices 106A, 106B may be any of a mobile phone, a tablet, or any other type of hand-held device, a smart watch or other wearable device, a media player, a computer, a laptop or virtually any type of wireless device.

The UEs 106A, 106B may each include a device or integrated circuit for facilitating cellular communication, referred to as a cellular modem. The cellular modem may include one or more processors (processing elements) and various hardware components as described herein. The UEs 106A, 106B may each perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UEs 106A, 106B may include one or more antennas for communicating using two or more wireless communication protocols or radio access technologies. In some embodiments, one or both of the UE 106A or UE 106B might be configured to communicate using a single shared radio. The shared radio may couple to a single antenna, or may couple to multiple antennas (e.g., for MIMO) for performing wireless communications. Alternatively, the UE 106A and/or UE 106B may include two or more radios. Other configurations are also possible.

Figure 3:
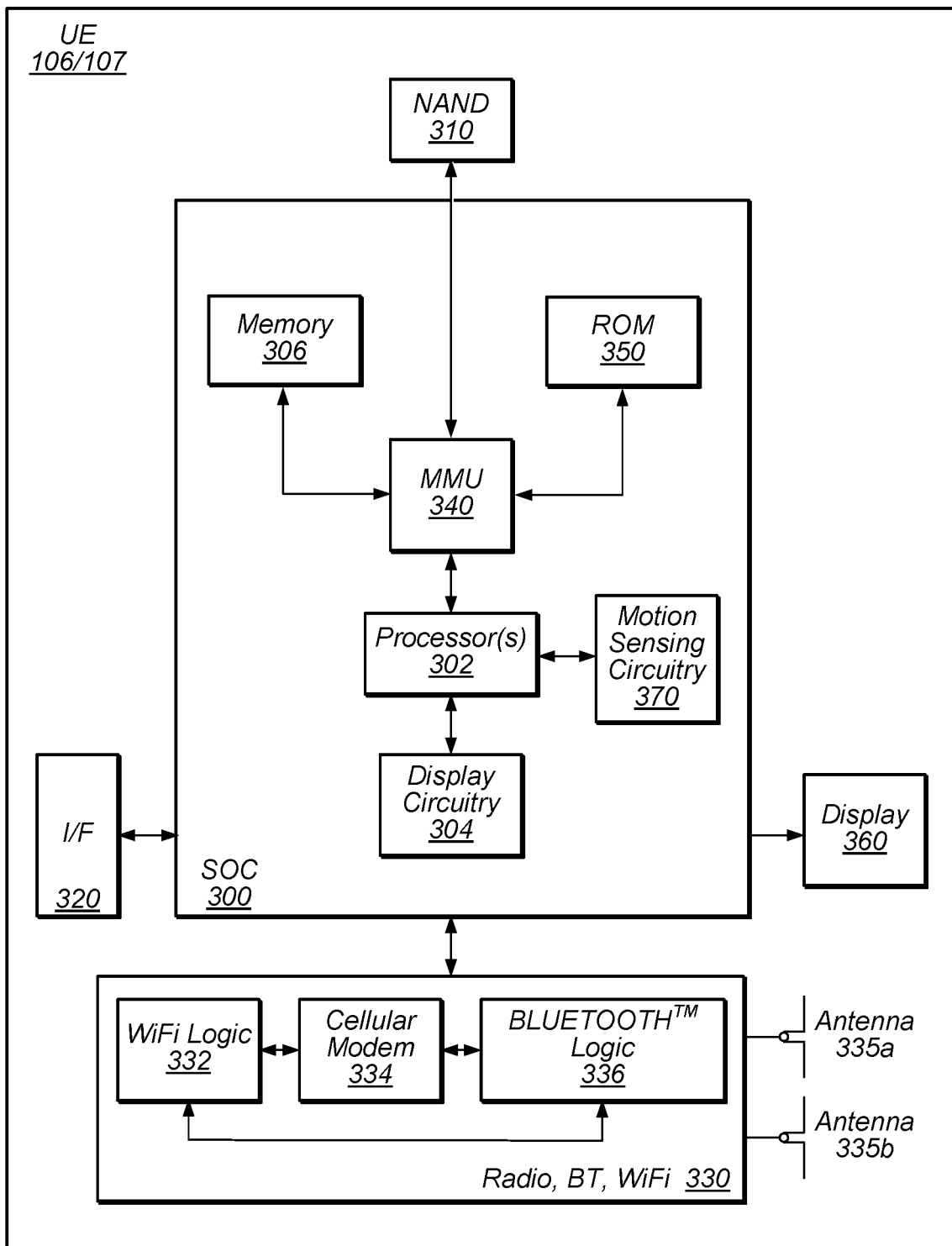
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, OGRS, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
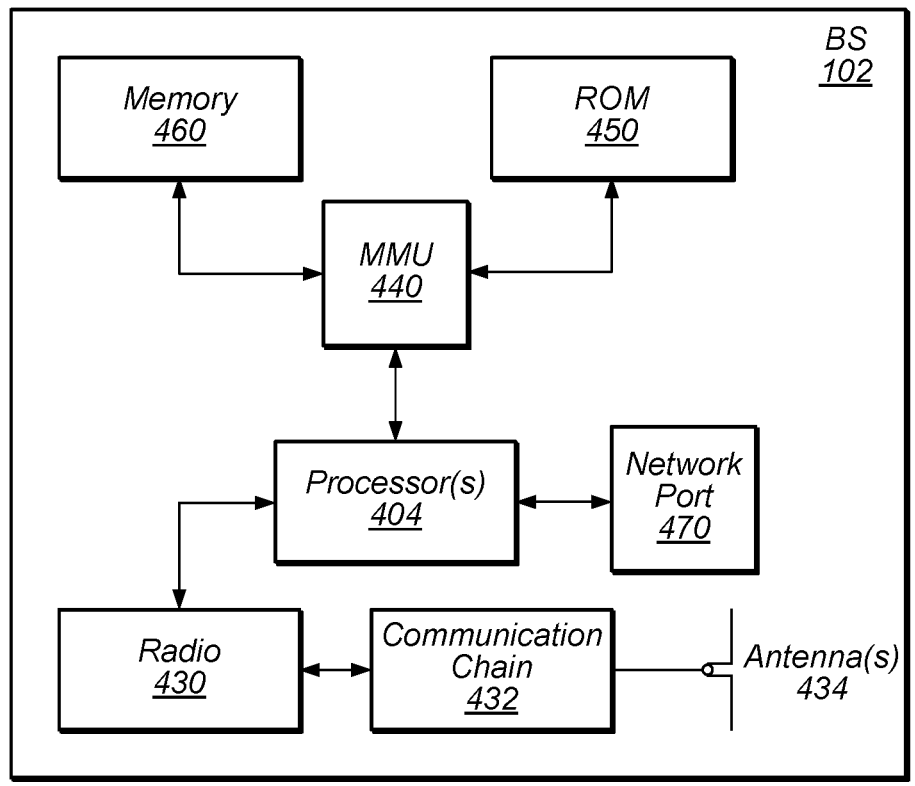
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, OGRS, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and NR, LTE and UMTS, LTE and CDMA2000, UMTS and GSM, etc.).

As described further subsequently herein, the BS 102 may include hardware and software components for implementing or supporting implementation of features described herein. For example, while many of the features described herein relate to device-to-device communication that can be performed by UE devices without relying on an intermediary base station, a cellular base station may be configured to also be capable of performing device-to-device communication in accordance with the features described herein. As another possibility, the BS 102 may be instrumental in configuring a UE 106 to perform device-to-device communication according to the features described herein, and/or certain features described herein may be performed or not performed by a device based at least in part on whether there is a BS 102 providing cellular service within range of the device. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
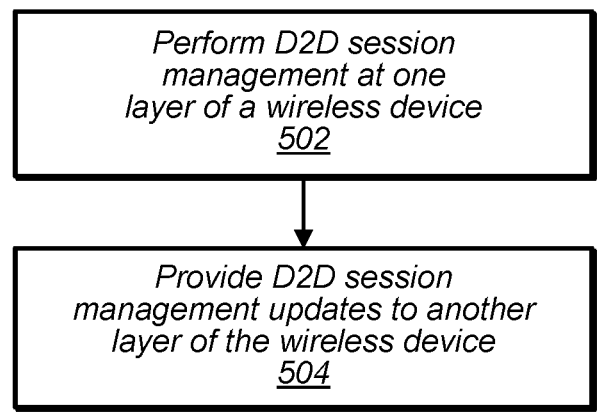

FIGS. 5-7—Communication Flow Diagram

FIGS. 5-7 are communication flow diagrams illustrating methods for performing device-to-device wireless communications with reduced overhead, according to some embodiments. In various embodiments, some of the elements of the methods shown may be performed concurrently, in a different order than shown, may be substituted for by other method elements, or may be omitted. Additional method elements may also be performed as desired.

Aspects of the methods of FIGS. 5-7 may be implemented by a wireless device, such as the UEs 106A-B or 107 illustrated in and described with respect to FIGS. 1-3, or more generally in conjunction with any of the computer systems or devices shown in the above Figures, among other devices, as desired. Note that while at least some elements of the methods of FIGS. 5-7 are described in a manner relating to the use of communication techniques and/or features associated with LTE, OGRS, and/or 3GPP specification documents, such description is not intended to be limiting to the disclosure, and aspects of the methods of FIGS. 5-7 may be used in any suitable wireless communication system, as desired.

For each of FIGS. 5-7, at least two wireless devices may form a device-to-device (D2D)/peer-to-peer (P2P) group, such as an OGRS group. This may include a master device transmitting synchronization signals, and any member devices obtaining synchronization to the OGRS group based on receiving the synchronization signals. A master information block (MIB) may also be transmitted by the group master and received by the group members, which may provide additional information such as possible discovery resources, a frequency hopping scheme used for discovery, and/or any of various other information.

As shown, the method of FIG. 5 may operate as follows. In 502, a first wireless device and a second wireless device (e.g., members of a P2P group), may initiate a D2D/P2P session, such as an OGRS session. One of the first and second wireless devices (e.g., the first wireless device) may transmit session initiation signaling over-the-air to the other wireless device (e.g., the second wireless device). The signaling to initiate the OGRS session may be originated at a protocol layer in a protocol stack of each wireless device. In some instances, the signaling may be associated with a protocol layer supported by an application processor of the wireless device. For example, the session initiation signaling may include TCP layer signaling, and/or application layer signaling.

The first wireless device and the second wireless device may perform further D2D/P2P session management functions (e.g., session modification, keep-alives, and/or eventually stopping the session) also using the same protocol layer (or possibly using another protocol layer in the same domain, e.g., also in the application processor domain). For example, signaling associated with that protocol layer may also be transmitted over the air when such further session management operations are desired.

In 504, the first wireless device may provide D2D/P2P session updates (e.g., OGRS session updates) to another protocol layer of the first wireless device. For example, updates may be provided indicating when a session is initiated, modified (e.g., a user is added or dropped), or stopped. The protocol layer receiving the session updates may be a protocol layer supported by a baseband processor of the first wireless device, according to some embodiments. For example, the updates may be provided to a protocol layer in a D2D modem protocol stack, according to some embodiments.

By providing a cross-layer communication mechanism and providing updates between protocol layers of the first wireless device (e.g., potentially including across domains between the application processor and baseband processor of the wireless device), this may allow the wireless device to reduce the over-the-air signaling burden on the D2D link, e.g., since potentially duplicative session management operations may be avoided. This may be particularly helpful for D2D links with relatively low bandwidth and/or throughput capability, for which such potentially redundant overhead communications may have a substantial impact on the ability of the devices using those links to communicate data with each other.

Note that such cross functional signaling and avoidance of redundant signaling may be extended to other functions, e.g., in addition to or as an alternative to session management signaling. For example, according to some embodiments, rather than duplicating authentication and/or encryption mechanisms at multiple protocol layers of a wireless device (e.g., which may serve the same function even if the exact mechanisms used at the different layers may not be identical), it may be possible to perform such functions at one protocol layer (e.g., a higher protocol layer such as a protocol layer supported by an application processor), rather than at multiple protocol layers. Thus, authentication and/or encryption for a D2D session could be performed using signaling associated with the desired protocol layer. If desired, indications of the authentication and/or encryption operations may be provided to one or more other protocol layers (e.g., from a protocol layer supported by an application processor to a protocol layer supported by a baseband processor), for example to confirm to the other protocol layer(s) that mechanisms supporting such functions are in place for the D2D session. This may help support the other protocol layer(s) foregoing performing over-the-air signaling that would duplicate such functionality, potentially reducing overhead communications performed over-the-air on the D2D link.

Note that while redundant signaling may be avoided by performing session management operations (and/or other operations, such as authentication/encryption) using higher layer signaling and providing session (and/or other) updates to lower protocol layers based on performing such operations, as one possibility, it may also be possible to avoid redundant over-the-air signaling by performing session management operations (and/or other operations) using lower layer signaling (e.g., using signaling associated with a protocol layer supported by a baseband processor of a wireless device) and providing session updates to higher protocol layers.

Further, note that while reference is made herein to scenarios in which a wireless device includes multiple processing domains (e.g., an application processor domain and a baseband processor domain) and 'higher' and 'lower' protocol layers of the protocol stack of a wireless device may be associated with different processing domains, other scenarios are also possible, for example in which an entire protocol stack is supported in a single processing domain, or in which more than two processing domains are used to support various protocol stack operations of a wireless device. The cross-functional signaling techniques of FIG. 5 may be used in any of such scenarios (among other possible scenarios) to potentially reduce over-the-air signaling, e.g., regardless of the processing domain(s) in which various protocol layers implementing such techniques are supported.

FIG. 6 is a flowchart diagram illustrating another possible type of cross functional signaling that could be used by a wireless device performing D2D wireless communication, according to some embodiments. In order to initiate a D2D session with a D2D peer, a wireless device may perform discovery (e.g., OGRS discovery) with the D2D peer. For example, one or both of the wireless device and the peer device may transmit discovery signals indicating the presence of the wireless device and the peer device. Once the devices have discovered each other's presence, further information exchange may be performed, including for authentication purposes. Additionally, each wireless device may be assigned an auto configuration IP (e.g., an IPv6) address, which the wireless devices may exchange as a further aspect of the discovery process. The IP address exchange may be performed at higher layers (e.g., at the IP layer and/or using a discovery application executed above the IP layer, however, at least according to some embodiments, such higher layer procedures may commonly include additional functionality and/or signaling that may be unnecessary for setting up a D2D session between the devices). Alternatively, the IP address exchange may be performed at a lower layer (e.g., the MAC layer), which may reduce the amount of signaling performed over the air, at least according to some embodiments. Thus, according to the method of FIG. 6, IP addresses may be exchanged between D2D peers using a protocol layer below the IP layer in the devices' protocol stacks. As shown, the method of FIG. 6 may operate as follows.

In 602, an indication of an IP address of a wireless device may be received at a protocol layer below the IP layer of the wireless device in the protocol stack of the wireless device. The indication may be received from an IP layer of the wireless device, according to some embodiments. The IP address may be an IPv6 address. According to some embodiments, the protocol layer below the IP layer of the wireless device may be a MAC layer of the wireless device. Other layers may alternatively be used, if desired.

In 604, the wireless device may exchange IP address information with a peer wireless device using signaling associated with the protocol layer below the IP layer of the wireless device in the protocol stack of the wireless device. For example, the wireless device may provide an indication of the IP address of the wireless device from the protocol layer below the IP layer of the wireless device to the peer wireless device (e.g., to a protocol layer below the IP layer of the peer wireless device, which may be a counterpart protocol layer to the protocol layer from which the indication of the IP address of the wireless device originates).

Similarly, the wireless device may receive an indication of the IP address of the peer wireless device from the peer wireless device (e.g., from a protocol layer below the IP layer of the peer wireless device to the protocol layer below the IP layer of the wireless device). The wireless device may provide an indication of the IP address for the second wireless device from the protocol layer below the IP layer in the protocol stack of the wireless device to the IP layer of the wireless device.

Thus, the wireless device (and potentially also the peer device) may be able to perform D2D discovery and share IP addresses without transmitting higher layer signaling over the air between the devices.

FIG. 7 is a flowchart diagram illustrating a cross layer link adaptation technique that could be used by a wireless device performing D2D wireless communication, according to some embodiments. Link adaptation techniques may be useful in wireless communication systems, e.g., in order to efficiently use a wireless communication medium. For example, it may be helpful for a wireless device to be relatively aggressive in accessing system resources in a non-congested environment (e.g., to provide better user experience), and to reduce the access to system resources in a congested environment (e.g., to reduce potential collisions and interference). However, at least in some instances, D2D baseband/modem layers may not include mechanisms for determining the link quality, and/or may otherwise benefit from receiving information indicative of link quality from higher layers that may be able to obtain or determine such information. Thus, according to the method of FIG. 7, information indicative of link quality may be provided from a higher layer of a wireless device to a lower layer of the wireless device, and the wireless device may perform link adaptation (e.g., may modify its use of the D2D link and/or may modify its D2D communication resource access) based at least in part on such information. As shown, the method may operate as follows.

In 702, a baseband layer (e.g., a MAC layer) of the wireless device may receive information indicative of D2D link quality from one or more higher layers (e.g., a protocol layer supported by an application processor of the wireless device, such as a TCP layer or an application layer). For example, the information may include values for one or more link quality metrics.

The higher layer(s) may gather the information indicative of D2D link quality, e.g., based on information transmitted and/or received over the D2D link at the higher layer(s). For example, a TCP layer may monitor/determine information relating to TCP acknowledgement (ACK) and/or negative acknowledgement (NACK) rate(s)/statistics. Alternatively or additionally, the TCP layer may determine the current TCP congestion window size. As a further possibility, an application layer may determine an end-to-end transmission delay for one or more transmissions communicated using the D2D link.

In 704, D2D link usage by the wireless device may be modified based at least in part on the information indicative of the D2D link quality. The link usage modification may include modifying the D2D communication resource access by the wireless device. For example, the next radio opportunity for the wireless device to perform D2D discovery using D2D communication resources, and/or the next radio opportunity for the wireless device to perform data communication using D2D communication resources, may be determined based at least in part on the information indicative of the D2D link quality. The amount of time until the next radio opportunity selected may be shorter when the information indicates relatively good D2D link quality and/or relatively low congestion, and may be longer (e.g., one or more intermediary discovery or data communication resource pools according to the D2D communication system may be skipped) when the information indicates relatively poor D2D link quality and/or relatively high congestion.

As another possibility, modifying D2D link usage by the wireless device may include selecting a new operating channel for the D2D link. For example, in cases of very high congestion, it may be helpful (e.g., both for the wireless device itself and for wireless devices remaining in the previous channel) for the wireless device to move to a different and potentially less congested channel to perform subsequent D2D communication.

Such link adaptation techniques based at least in part on link quality information received from upper layers of a wireless device may thus help the wireless device adapt to current radio conditions. This may be particularly helpful if the D2D lower (e.g., baseband) layers do not natively include mechanisms for link assessment, such as if no radio link control (RLC) ACK/NACKs or hybrid authomatic repeat request (HARD) ACK/NACKs are used and no other radio link monitoring techniques are in use, such as may be the case for at least some OGRS communications.

FIGS. 8-12 and Additional Information

FIGS. 8-12 and the following additional information are provided as being illustrative of further considerations and possible implementation details relating to the methods of FIGS. 5-7, and are not intended to be limiting to the disclosure as a whole. Numerous variations and alternatives to the details provided herein below are possible and should be considered within the scope of the disclosure.

At least some existing wireless communication technologies include framework elements for D2D/P2P communication, which may also be referred to as sidelink communication. For example, the 3GPP standards organization includes D2D/sidelink protocols, e.g, in which in addition to synchronization signals transmitted in the central 6 RBs of the system bandwidth, discovery pool resources, sidelink control channel allocations, and sidelink shared channel allocations may be located in various other (e.g., outer) RBs of the system bandwidth over time. Such sidelink communication performed according to D2D protocols may encompass a variety of possible operating bandwidths, e.g., encompassing at least 6 RBs (e.g., 1.4 MHz) and potentially up to 100 RBs (e.g., 20 MHz), according to some embodiments. As another possibility, a more narrowband (e.g., 180 kHz) deployment may be used, if desired. For example, for the transmit power regimes of many devices, propagation characteristics for narrowband communications may result in greater range capacity than wider-band communications.

As another possibility for potentially providing a relatively long communication range for D2D communication, at least in some instances a lower-frequency communication band (e.g., 900 MHz unlicensed spectrum, as one possibility) may be used for D2D communication.

According to some embodiments, the techniques described herein may be used in scenarios when one or more of the communicating wireless devices are not within communication range of a cellular base station (e.g., the devices may be OOC), according to some embodiments. For example, D2D communication techniques may be used to allow two (or more) peer devices to communicate in isolated areas without cellular service, without a cellular service subscription, and/or under other circumstances.

As one possibility for providing a physical narrowband carrier for narrowband D2D communications, a NB-IoT carrier may be used. FIG. 8 illustrates a variety of exemplary possible NB-IoT carrier deployment modes, according to some embodiments. The illustrated deployment modes include standalone deployments (e.g., in a repurposed GSM band), guardband deployments (e.g., in a guardband frequency between LTE carriers), and inband deployments (e.g., within an LTE carrier). In any of these possible deployment modes, NB-IoT carriers may include a variety of features. For example, among various possible characteristics, NB-IoT carriers may support flexible timelines for control and data channels; peak rates of approximately 20 kbps in the downlink and 60 kbps in the uplink may be supported; single tone (e.g., 3.75 KHz vs. 15 KHz) and multi tone (15 kHz) uplink modulation, using pi/2 binary phase shift keying or pi/4 quadrature phase shift keying may be used (quadrature phase shift keying may also be used in the downlink); single antenna, half duplex frequency division duplexing may be used; and/or a per-UE carrier bandwidth of 180 kHz may be used, according to some embodiments. As further possible example radio access network (RAN)/ evolved packet core (EPC) features, NB-IoT carriers may include mandatory data over non-access stratum (DoNAS) support, optional radio resource control (RRC) suspend/ resume support, eDRX support, and multi-physical resource block (PRB) support, according to some embodiments. Frequency hopping features for D2D communications may be supported. In some instances, NB-IoT carriers may provide coverage enchancement features for supporting coverage up to 20 dB.

Off Grid Radio Service (OGRS) is a system that is being developed to provide long range P2P/D2D communication, e.g., in absence of a wide area network (WAN) or WLAN radio connection to support a variety of possible features. For example, as one possibility, OGRS service may be used by wireless devices by messaging applications (e.g., for exchanging text messages, voice/audio clips, etc.) and/or other types of applications for device-to-device long range communication without requiring network infrastructure or Internet connectivity. At least according to some embodiments, OGRS systems may support some or all of the features previously described herein, such as any of the features or steps of the methods of FIGS. 5-7.

According to some embodiments, OGRS may operate in unlicensed low ISM bands, e.g., between 700 MHz and 1 GHz (or higher), for extended range purposes, and may use one or multiple carriers of approximately 200 kHz to 500 kHz, e.g., depending in regulatory requirements. OGRS may be designed to meet the local spectrum regulatory requirements, such as channel duty cycle, operating frequencies, hopping pattern, LBT, maximum transmit power, and occupied bandwidth.

Figure 9:
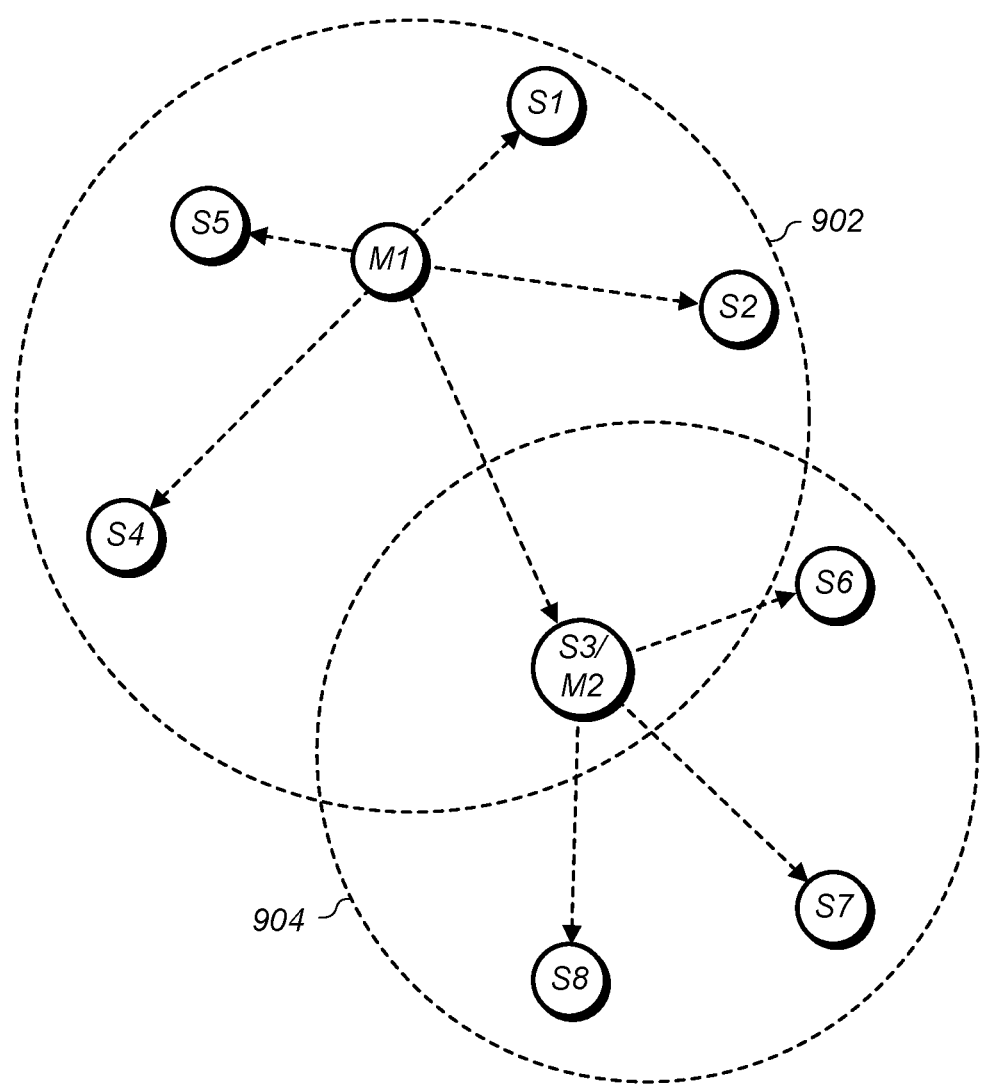
FIG. 9 illustrates aspects of an exemplary possible OGRS communication system, according to some embodiments.

FIG. 9 illustrates aspects of an exemplary possible OGRS communication system, according to some embodiments. As shown, the system may include a first OGRS group 902 and a second OGRS group 904. In a given environment, an OGRS group may operate independently, or multiple OGRS groups may co-exist, e.g., as illustrated in FIG. 9. Each of the groups may have a group master and group members; for example, the first OGRS group 902 may include a 'master' M1, along with several 'slaves' S1, S2, S3, S4, S5. A master in a group may transmit synchronization channels to which other members in the group, and any devices that wish to join the group, may obtain synchroniztion. For example, the synchronization channel(s) may assist with bringing all the members in the group to a common frequency and time, and may be helpful for the nodes in the group for later communication.

Synchronization can be extended when a particular node in the group is below a threshold, e.g., to facilitate the discovery and serving of new nodes that are beyond the current group's range. For example, node S3 in the first OGRS group 902 may (e.g., based on distance from M1) determine to establish the second OGRS group 904 and may act as the master M2 for the second OGRS group 904, which may be joined by nodes S6, S7, S8, as shown.

According to some embodiments, OGRS service may support relatively low throughput (e.g., from 0.5 to 30 kbps, as one possibility) between users. At least in some instances, it may be desirable for OGRS service to allow users to efficiently and securely perform discovery and authentication of contacts, and to establish a secured and encrypted peer-to-peer communication link.

Figure 10:
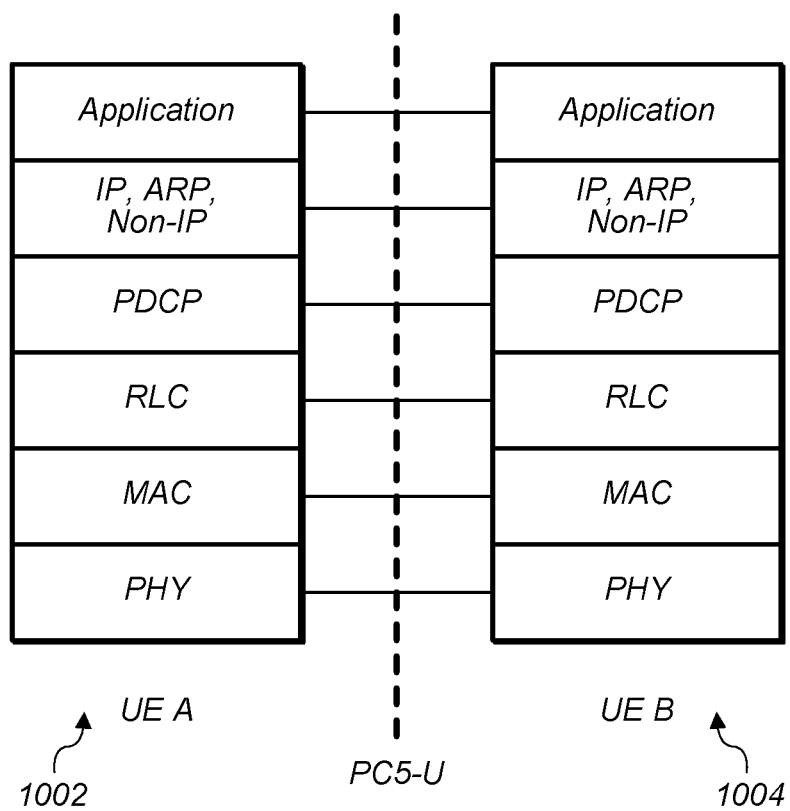
FIG. 10 illustrates aspects of exemplary possible protocol stacks for wireless devices performing device-to-device wireless communications, according to some embodiments.

FIG. 10 illustrates aspects of exemplary possible protocol stacks for wireless devices performing device-to-device wireless communications, according to some embodiments. Note that other protocol stacks (e.g., including variations on the illustrated protocol stacks and/or alternatives to the illustrated protocol stacks) are also possible. As shown, each of various protocol layers of UE A 1002 and UE B 1004, including application, IP/ARP/non-IP, PDCP, RLC, MAC, and PHY, may be capable of exchanging signaling/communication (e.g., over-the-air, by way of a physical air interface between the devices).

Accordingly, it may be possible to identify users and authenticate them at multiple layers (e.g., using a protocol layer in the D2D protocol stack, such as the PDCP/NAS security over MAC layer, and also using a protocol layer in a higher layer of the protocol stack, such as the application layer). This may include generating and transmitting more (e.g., approximately twice as much, in some instances) signaling over the air than necessary to perform the desired functions. Similarly, at least in some instances, D2D security and encrypting mechanisms may exist, but also different and potentially duplicative encryption mechanisms may be used at higher layers. Further, layer 3 messages and D2D state machine maintenance may potentially effectively duplicate higher layer TCP and/or application layer session management, according to some embodiments. Still further, in some instances application layer discovery software/toolkits, which could be used for certain discovery features, may include substantial overhead for features that are not needed for D2D communication, while the needed functionality (e.g., exchange of IPv6 addresses) could be achieved more efficiently through dedicated exchange of messages at a lower layer (e.g., a D2D MAC layer). Because OGRS may utilize relatively little bandwidth and provide relatively little throughput, it may be correspondingly more useful to avoid such duplication between D2D modem protocol layers and higher layer functionality and otherwise avoid extraneous signaling such that the same functionality can be provided with a reduced over-the-air signaling overhead.

Additionally, at least according to some embodiments, OGRS may leverage a D2D based protocol in which there are no RLC ACK/NACKs, no HARQ ACK/NACKs, and no radio link monitoring. This may create difficulty for the resource allocation algorithm of the OGRS MAC layer to understand the state of the spectrum, the ratio of good vs. bad decoded packets, and/or other aspects of link quality. Further, without such information, it may be difficult for the D2D modem to identify a situation in which the OGRS spectrum is in a congested state, e.g., such that it may be beneficial for OGRS devices to back-off their use of the spectrum, utilize rate adaptation, and/or reduce the rate of accessing radio resource pools over the air. In other words, if the OGRS modem does not have a way to monitor the OGRS link status, it may be impossible to adapt a wireless device's quality of services to the state of the spectrum.

Accordingly, as a way to facilitate the reduction of extraneous over-the-air signaling overhead and improve the link monitoring capability of an OGRS device, it may be useful to introduce or increase the cross-layer communication capabilities of the OGRS device, potentially including providing cross-functional signaling capabilities between different protocol layers of the OGRS device, for example between the TCP layer and the OGRS MAC layer.

Figure 11:
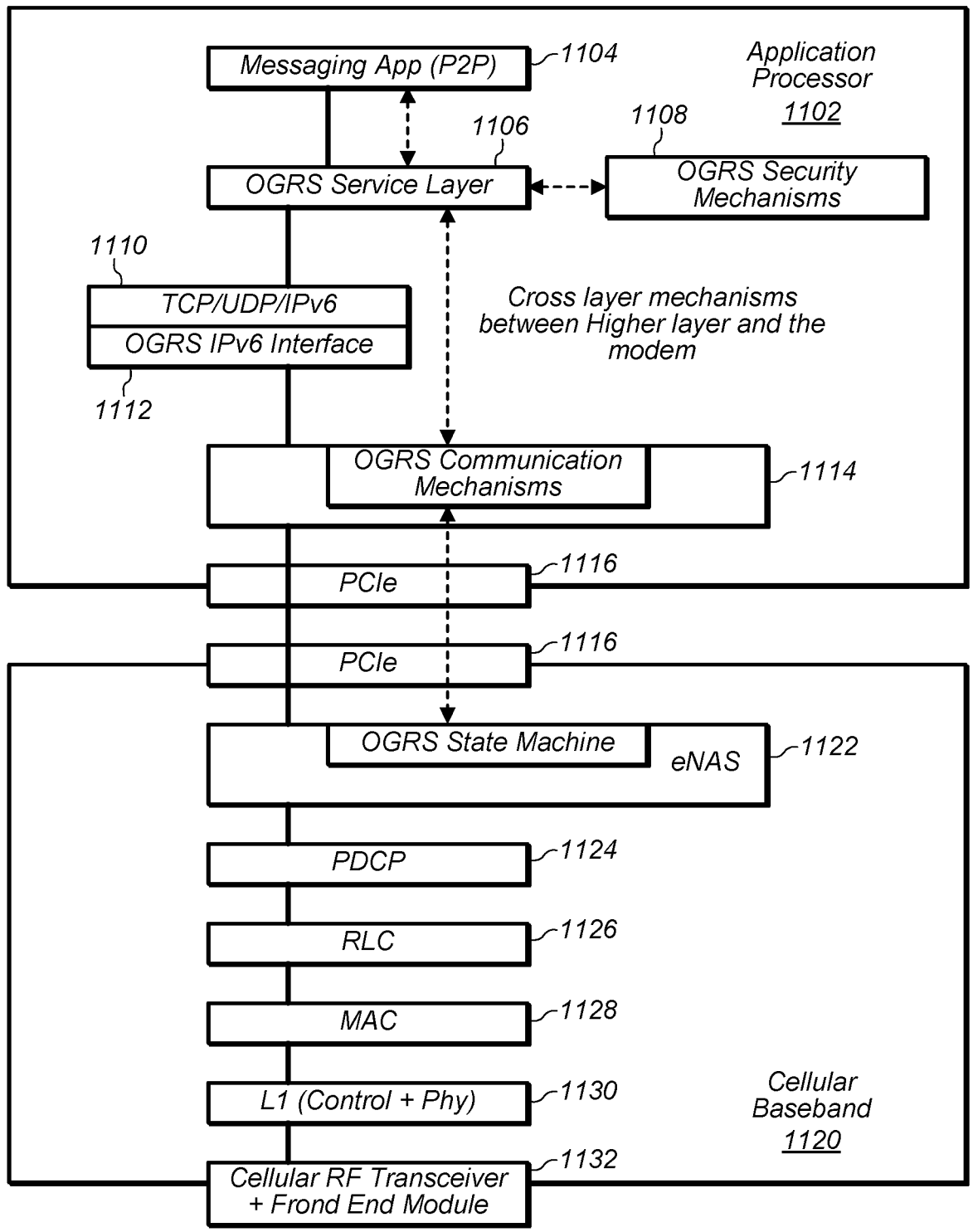
FIG. 11 illustrates aspects of an exemplary wireless device configured to use cross functional signaling in conjunction with OGRS communication, according to some embodiments.

FIG. 11 illustrates aspects of an exemplary wireless device configured to use such cross functional signaling in conjunction with OGRS communication, according to some embodiments. The exemplary wireless device illustrated may include two processing domains: an application processor 1102 domain and a baseband processor 1120 domain. The application processor 1102 may support a messaging application 1104, which may be capable of utilizing P2P communication capability of the wireless device. The messaging app 1104 may interface with an OGRS service layer 1106, which may utilize OGRS security mechanisms 1108. The application processor 1102 may further support TCP/UDP/IPv6 functionality 1110, including an OGRS IPv6 interface 1112. Additionally, the application processor 1102 may support OGRS communication mechanisms 1114, which may facilitate cross-layer communication between the application processor 1102 domain protocol layers and the baseband processor 1120 domain protocol layers. An HSIC or PCIe interface 1116 may provide a physical and logical interface between the processing domains.

The baseband processor 1120 may support an eNAS layer 1122, which may include OGRS state machine functionality. Additionally, the baseband processor may support a PDCP layer 1124, a RLC layer 1126, a MAC layer 1128, and a L1 (control and PHY) layer 1130. The L1 layer 1130 may interface with the Physical layer/DSP and/or cellular RF transceiver and front end module 1132 that may generate and transmit waveforms for over-the-air transmission.

One way to reduce the protocol overhead over-the-air using such a framework (or another framework capable of supporting such cross functional signaling) may include eliminating the D2D protocol signaling generated in the modem to maintain and establish an OGRS session status in the baseband. It may further be possible to eliminate the security protocol in the D2D protocol stack using such a framework.

For example, upper layer (e.g., TCP and application layer) signaling may be used to maintain and establish an OGRS session on the application processor side and also on the modem side. When a user starts an OGRS session, application layer messages over TCP may be used to create a session, add a user, remove a user, or stop OGRS service. High layer authentication and encryption mechanisms may be used. In order to maintain the session and state machine in the modem, signaling capability (e.g., such as illustrated in FIG. 11) between the application layer and the D2D protocol stack may be used. Thus, when the OGRS session is created or modified at the application layer, an indication may be sent to the modem protocol stack. Additionally, keep-alive messages for the session may be exchanged at the TCP layer, and the resulting session status may also be indicated to the modem D2D protocol stack.

As previously noted, when OGRS service starts in two devices wishing to communicate with each other, the two devices may perform discovery to discover each other. The devices may further perform authentication, and assign auto configuration IPv6 addresses. In order to retrieve the IPv6 address of each device, the IPv6 layer in the application processor domain may send each device's IPv6 address to its modem. Each device's OGRS modem protocol stack may send the IPv6 address of that device with the PHY ID to the other device, and upon receiving the other device's IPv6 address, may provide that to the device's IPv6 layer. This may complete OGRS discovery such that IPv6 addresses may be shared without the need for exchanging signaling associated with higher layers over-the-air.

Figure 12:
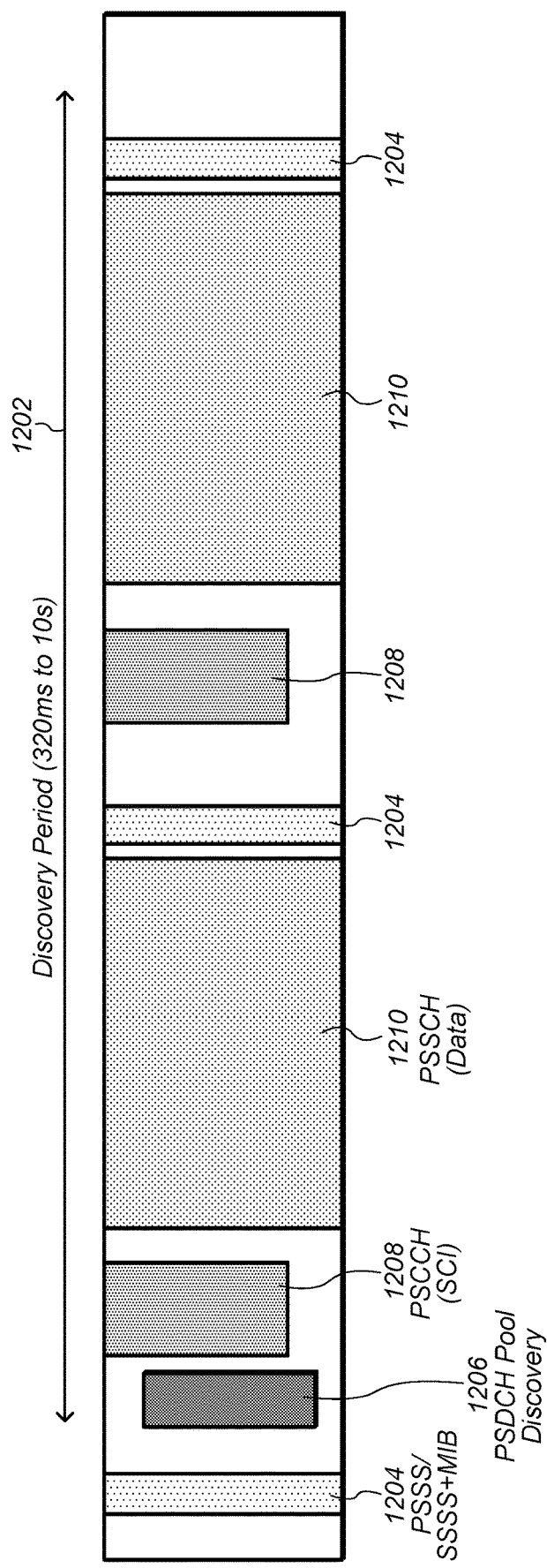
FIG. 12 illustrates an exemplary set of possible OGRS discovery and communication pools, according to some embodiments.

As further previously noted, at least according to some embodiments it may be desirable for the OGRS modem to perform link adaptation for an OGRS link, e.g., including adjusting the transmission Quality of Service (QoS) based on the link quality and level of interference and frequency of collisions. One way to adjust the QoS in OGRS may include incorporating link quality information into the MAC algorithm used to select D2D discovery and communication pools. For example, FIG. 12 illustrates an exemplary set of possible OGRS discovery and communication pools, according to some embodiments, among which a wireless device could select a next discovery and/or data communication opportunity based at least in part on its estimation of the link quality, interference levels, and/or congestions levels.

As shown, according to the illustrated timeline synchronization signals (e.g., primary sidelink synchronization signals (PSSS), secondary sidelink synchronization signals (SSSS), and a master information block (MIB)) 1204 may be transmitted periodically, e.g., by a OGRS group master device. Certain resources in the communication channel used by the OGRS group may be set aside for a physical sidelink discovery channel (PSDCH) 1206 (e.g., a pool of discovery resources), for a physical sidelink control channel (PSCCH) 1208 (e.g., for communicating sidelink control information (SCI)), and for a physical sidelink shared channel (PSSCH) 1210 (e.g., a pool of data communication resources).

As one possibility, a wireless device may adjust its access rate to the available resource pools based on the success rate of transmissions to and/or from the wireless device. This may facilitate the wireless device being able to be aggressive in accessing resources in a non-congested environment (e.g., potentially leading to better user experience), and to reduce the access to radio resources in a congested environment (e.g., potentially reducing the amount of interference caused and the likelihood of collisions).

Since OGRS D2D may not support RLC mechanisms for OGRS link assessment (or even if such mechanisms are supported), it may be useful to gather data/statistics that can support such link adaptation at higher layers, e.g., in the application processor domain. For example, a software component may gather TCP ACK/NACK rate and statistics, a TCP congestion window size, and/or an application layer end-to-end transmission delay. Based on these statistics, the software component could provide a (e.g., real time) assessment of the current OGRS link performance, and/or could provide such information to the D2D modem to generate its own assessment of the current OGRS link performance. To support provision of such information, an interface for communicating information between this software component (e.g., in the application processor domain) and the MAC layer of the D2D modem may be provided, and may be used to update the MAC layer with the status of the OGRS link (e.g., at regular intervals, upon receiving a request for an update from the MAC layer, and/or based on any of various other possible triggers). The D2D MAC layer may then use this information to update (e.g., in real time) the algorithm used to calculate the next radio opportunity for the wireless device to use for discovery and/or data communication messages. In some instances (e.g., in case of very high congestion), the D2D MAC layer may also or alternatively use this information to determine to change the operating channel for the OGRS link.

In the following further exemplary embodiments are provided.

One set of embodiments may include a method, comprising: by a first wireless device: initiating an off-grid radio service (OGRS) session with a second wireless device at a protocol layer supported by an application processor of the first wireless device, wherein OGRS session initiation signaling communicated over-the-air between the first wireless device and the second wireless device comprises signaling associated with the protocol layer supported by the application processor of the first wireless device; and providing an indication of initiation of the OGRS session from the protocol layer supported by the application processor to a protocol layer supported by a baseband processor of the first wireless device based at least in part on initiating the OGRS session with the second wireless device at the protocol layer supported by the application processor of the first wireless device.

According to some embodiments, the method further comprises, by the first wireless device: communicating OGRS session modification signaling associated with the protocol layer supported by the application processor of the first wireless device over-the-air between the first wireless device and the second wireless device; and providing an indication of the OGRS session modification from the protocol layer supported by the application processor to the protocol layer supported by the baseband processor of the first wireless device based at least in part on communicating the OGRS session modification signaling associated with the protocol layer supported by the application processor of the first wireless device over-the-air between the first wireless device and the second wireless device.

According to some embodiments, the method further comprises, by the first wireless device: transmitting and receiving keep-alive messages for the OGRS session at a transmission control protocol layer of the first wireless device.

According to some embodiments, the method further comprises, by the first wireless device: performing authentication for the OGRS session using signaling associated with a protocol layer supported by the application processor of the first wireless device, wherein authentication for the OGRS session is not performed at a protocol layer supported by the baseband processor of the first wireless device.

According to some embodiments, the method further comprises, by the first wireless device: performing encryption for the OGRS session at a protocol layer supported by the application processor of the first wireless device, wherein encryption for the OGRS session is not performed at a protocol layer supported by the baseband processor of the first wireless device.

A further set of embodiments may include a method, comprising: by a first wireless device: performing off-grid radio service (OGRS) discovery with a second wireless device; performing OGRS authentication with the second wireless device; determining an internet protocol (IP) address for the first wireless device; providing an indication of the IP address for the first wireless device from an IP layer of the first wireless device to a protocol layer below the IP layer in a protocol stack of the first wireless device; and providing an indication of the IP address for the first wireless device from the protocol layer below the IP layer in the protocol stack of the first wireless device to the second wireless device.

According to some embodiments, the IP address for the first wireless device comprises an IPv6 address.

According to some embodiments, the method further comprises: receiving an indication of an IP address for the second wireless device from the second wireless device at the protocol layer below the IP layer in the protocol stack of the first wireless device; and providing an indication of the IP address for the second wireless device from the protocol layer below the IP layer in the protocol stack of the first wireless device to the IP layer of the first wireless device.

According to some embodiments, the IP address for the second wireless device comprises an IPv6 address.

Yet another set of embodiments may include a method, comprising: by a first wireless device: establishing a off-grid radio service (OGRS) link with a second wireless device; determining, at a protocol layer supported by an application processor of the first wireless device, one or more link quality metric values for the OGRS link; providing an indication of the one or more link quality metric values for the OGRS link to a protocol layer supported by a baseband processor of the first wireless device; and modifying use of the OGRS link by the first wireless device based at least in part on the indication of the one or more link quality metric values for the OGRS link.

According to some embodiments, the one or more link quality metric values comprise a transmission control protocol (TCP) ACK/NACK rate.

According to some embodiments, the one or more link quality metric values comprise a transmission control protocol (TCP) congestion window size.

According to some embodiments, the one or more link quality metric values comprise an application layer end-to-end transmission delay rate for one or more transmissions using the OGRS link.

According to some embodiments, modifying use of the OGRS link based at least in part on the indication of the one or more link quality metric values for the OGRS link comprises selecting a next radio opportunity for one or more of discovery or data communication based at least in part on the indication of the one or more link quality metric values for the OGRS link.

According to some embodiments, modifying use of the OGRS link based at least in part on the indication of the one or more link quality metric values for the OGRS link comprises selecting a new operating channel for the OGRS link based at least in part on the indication of the one or more link quality metric values for the OGRS link.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
by a first wireless device:
initiating a device-to-device (D2D) session with a second wireless device at a first protocol layer, wherein D2D session initiation signaling communicated over-the-air between the first wireless device and the second wireless device comprises signaling associated with the first protocol layer, wherein the first protocol layer is an application layer of the first wireless device;
providing an indication of initiation of the D2D session from the first protocol layer to a second protocol layer based at least in part on initiating the D2D session with the second wireless device at the first protocol layer, wherein the second protocol layer is a layer lower than the application layer of the first wireless device;
communicating D2D session modification signaling associated with the first protocol layer over-the-air between the first wireless device and the second wireless device; and
providing an indication of the D2D session modification from the first protocol layer to the second protocol layer based at least in part on communicating the D2D session modification signaling associated with the first protocol layer over-the-air between the first wireless device and the second wireless device.

2. The method of claim 1, further comprising, by the first wireless device:
communicating D2D session closing signaling associated with the first protocol layer over-the-air between the first wireless device and the second wireless device; and
providing an indication of the D2D session closing from the first protocol layer to the second protocol layer based at least in part on communicating the D2D session closing signaling associated with the first protocol layer over-the-air between the first wireless device and the second wireless device.

3. The method of claim 1, further comprising, by the first wireless device:
transmitting and receiving keep-alive messages for the D2D session at a transmission control protocol layer of the first wireless device.

4. The method of claim 1, further comprising, by the first wireless device:
performing authentication for the D2D session using signaling associated with the first protocol layer,
wherein authentication for the D2D session is not performed at the second protocol layer.

5. The method of claim 1, further comprising, by the first wireless device:
performing encryption for the D2D session at the first protocol layer,
wherein encryption for the D2D session is not performed at the second protocol layer.

6. The method of claim 1,
wherein the D2D session comprises an off-grid radio service (OGRS) session.

7. An apparatus for implementation in a first wireless device, comprising:
one or more processors, wherein the one or more processors are configured to cause the first wireless device to:
initiate a device-to-device (D2D) session with a second wireless device at a first protocol layer, wherein D2D session initiation signaling communicated over-the-air between the first wireless device and the second wireless device comprises signaling associated with the first protocol layer, wherein the first protocol layer is an application layer of the first wireless device;
provide an indication of initiation of the D2D session from the first protocol layer to a second protocol layer based at least in part on initiating the D2D session with the second wireless device at the first protocol layer, wherein the second protocol layer is a layer lower than the application layer of the first wireless device;
communicate D2D session modification signaling associated with the first protocol layer over-the-air between the first wireless device and the second wireless device; and
provide an indication of the D2D session modification from the first protocol layer to the second protocol layer based at least in part on communicating the D2D session modification signaling associated with the first protocol layer over-the-air between the first wireless device and the second wireless device.

8. The apparatus of claim 7, wherein the one or more processors are further configured to:
communicate D2D session closing signaling associated with the first protocol layer over-the-air between the first wireless device and the second wireless device; and
provide an indication of the D2D session closing from the first protocol layer to the second protocol layer based at least in part on communicating the D2D session closing signaling associated with the first protocol layer over-the-air between the first wireless device and the second wireless device.

9. The apparatus of claim 7, wherein the one or more processors are further configured to:
transmit and receive keep-alive messages for the D2D session at a transmission control protocol layer of the first wireless device.

10. The apparatus of claim 7, wherein the one or more processors are further configured to:
perform authentication for the D2D session using signaling associated with the first protocol layer,
wherein authentication for the D2D session is not performed at the second protocol layer.

11. The apparatus of claim 7, wherein the one or more processors are further configured to:
perform encryption for the D2D session at the first protocol layer,
wherein encryption for the D2D session is not performed at the second protocol layer.

12. The apparatus of claim 7, wherein the one or more processors are further configured to:
transmit and receive keep-alive messages for the D2D session at a transmission control protocol layer of the first wireless device.

13. A first wireless device, comprising:
an antenna;
a radio operably coupled to the antenna;
at least one processor operably coupled to the radio; and
wherein the first wireless device is configured to:
initiate a device-to-device (D2D) session with a second wireless device at a first protocol layer, wherein D2D session initiation signaling communicated over-the-air between the first wireless device and the second wireless device comprises signaling associated with the first protocol layer, wherein the first protocol layer is an application layer of the first wireless device; and
provide an indication of initiation of the D2D session from the first protocol layer to a second protocol layer based at least in part on initiating the D2D session with the second wireless device at the first protocol layer, wherein the second protocol layer is a layer lower than the application layer of the first wireless device;
communicate D2D session modification signaling associated with the first protocol layer over-the-air between the first wireless device and the second wireless device; and
provide an indication of the D2D session modification from the first protocol layer to the second protocol layer based at least in part on communicating the D2D session modification signaling associated with the first protocol layer over-the-air between the first wireless device and the second wireless device.

14. The first wireless device of claim 13, wherein the first wireless device is further configured to:
communicate D2D session closing signaling associated with the first protocol layer over-the-air between the first wireless device and the second wireless device; and
provide an indication of the D2D session closing from the first protocol layer to the second protocol layer based at least in part on communicating the D2D session closing signaling associated with the first protocol layer over-the-air between the first wireless device and the second wireless device.

15. The first wireless device of claim 13, wherein the first wireless device is further configured to:
perform authentication for the D2D session using signaling associated with the first protocol layer,
wherein authentication for the D2D session is not performed at the second protocol layer.

16. The first wireless device of claim 13, wherein the first wireless device is further configured to:
perform encryption for the D2D session at the first protocol layer,
wherein encryption for the D2D session is not performed at the second protocol layer.

17. The first wireless device of claim 13, wherein the first wireless device is further configured to:
transmit and receive keep-alive messages for the D2D session at a transmission control protocol layer of the first wireless device.

* * * * *